United States Patent [19]

Gagliani et al.

[11] 4,319,000

[45] Mar. 9, 1982

[54] CLOSED CELL POLYIMIDES

[75] Inventors: John Gagliani, San Diego; John V. Long, El Cajon, both of Calif.

[73] Assignee: International Harvester Company, Chicago, Ill.

[21] Appl. No.: 248,893

[22] Filed: Mar. 30, 1981

Related U.S. Application Data

[60] Continuation-in-part of Ser. No. 856,970, Dec. 2, 1977, abandoned, which is a division of Ser. No. 581,136, May 27, 1975, Pat. No. 4,070,312.

[51] Int. Cl.³ .......................... C08G 12/12; C08V 9/00
[52] U.S. Cl. ...................................... 521/189; 521/77; 521/185; 528/229; 528/353
[58] Field of Search .................................. 521/77, 189

[56] References Cited

U.S. PATENT DOCUMENTS

| | | | |
|---|---|---|---|
| 3,249,561 | 5/1966 | Hendrix | 521/189 |
| 3,506,583 | 4/1970 | Boram et al. | 252/188.3 R |
| 3,700,649 | 10/1972 | Boram et al. | 528/226 |
| 3,726,834 | 4/1973 | Acle, Jr. | 528/229 |
| 3,793,281 | 2/1974 | Acle, Jr. | 521/56 |
| 3,966,652 | 6/1976 | Gagliani et al. | 521/185 |
| 4,153,783 | 5/1979 | Gagliani et al. | 521/110 |

*Primary Examiner*—Morton Foelak
*Attorney, Agent, or Firm*—LeBlanc, Nolan, Shur & Nies

[57] ABSTRACT

Closed cell polyimide foams. Methods of making such foams from precursors derived from a benzophenone-tetracarboxylic acid diester and a mixture of diamines in which the precursor is molded to shape and cured, hydrated, and heated until a porous, closed cell structure develops.

16 Claims, No Drawings

CLOSED CELL POLYIMIDES

This application is a continuation-in-part of application Ser. No. 856,970 filed Dec. 2, 1977 (now abandoned). The latter is a division of application Ser. No. 581,136 filed May 27, 1975 (now U.S. Pat. No. 4,070,312 issued Jan. 29, 1978).

The invention relates to polyimides and, more particularly, to polyimides having a novel porous, closed cell structure and to methods for making such polyimides.

Our novel polyimides are thermally stable at high temperatures and possess the mechanical strength needed for dynamic applications; that is, applications in which they are in contact with moving parts. They possess high tensile and compressive strengths and low oil, solvent, and water absorption over a wide range of temperatures——$-200°$ C. to $+315°$ C. ($-328°$ F. to $+599°$ F.).

Their unique properties make our novel polyimides useful in such diverse applications as oil seals, bushings, washers, heat shields, gaskets, and low density functional parts.

Our novel polyimides are prepared from a diester of 3,3',4,4'-benzophenonetetracarboxylic acid (or mixture of such diesters) and a mixture of two or more aromatic or heterocyclic, primary diamines. The diamines must be para- or meta-substituted, aromatic, and free of aliphatic moieties or heterocyclic.

One of the diamines must have a base dissociation constant lower than $10^{-10}$. Although it is not essential as will become apparent hereinafter, it is preferred that all of the diamines possess this characteristic.

As few as two diamines may be employed. However, for applications where low density is desired, three or more diamines may be used.

Illustrative of the meta- or para-substituted, aromatic and heterocyclic diamines which may be employed are:
3,3'-diaminodiphenylsulfone
4,4-diaminodiphenylsulfone
2,6-diaminopyridine
metaphenylenediamine
paraphenylenediamine The preferred polyimides are those made from 3,3',4,4'-benzophenonetetracarboxylic acid and diamines from the foregoing list with the imide forming functionalities of the diamines and of the tetracarboxylic acid diester or diesters present in substantially equimolar amounts and with a random distribution of dissimilar repeating units.

The initial step in preparing our novel, closed cell polyimide foams is to react 3,3',4,4'-benzophenonetetracarboxylic acid or its anhydride with an esterifying agent to convert the acid or anhydride to a diester. Ethanol will typically be employed as the esterifying agent because of its widespread availability, low cost, and other attributes. However, other alkyl alcohols can be used instead; and we have shown hereinafter that heptanol, for example, is a satisfactory esterifying agent.

Esterification of the acidic component is followed by addition of the diamines. Excess solvent is then removed, leaving an amorphous resinoid which has an essentially indefinite shelf life.

The solid state solution or resinoid can be converted to the corresponding copolyimide by heating it first to a temperature in the range of about 125° C. to about 150° C., which produces an open cell foam. This foam is ground and the resulting particulate material heated to a temperature in the range of 300° to 325° C. for 2–12 hours until it is fully cured; i.e., converted to polyimide.

The cured polymer can then be placed in a mold and caused to flow at a temperature of 300°–350° C. or higher under moderate pressures (300–2000 psi) to form it without chemical reactions into a dense, void-free artifact of a shape which can be highly complex.

The steps of our process for making closed cell polyimides thus far described are disclosed in detail in U.S. Pat. Nos. 3,506,583 issued Apr. 14, 1970, to Boram et al for MONOMERIC, SOLID STATE SOLUTIONS OF CERTAIN AROMATIC DIAMINES IN DERIVATIVES OF BENZOPHENONETETRACARBOXYLIC ACID and 3,793,281 issued Feb. 19, 1974, to Acle for THERMOPLASTIC COPOLYIMIDES, both of which are hereby incorporated herein.

We develop a porous, closed cell structure in the dense polyimide existing at the end of the molding and curing step by first hydrating the molded part and then heating it at an elevated temperature.

Hydration is effected by heating the polyimide in an aqueous medium at a temperature of 25°–250° C. under atmospheric or an elevated pressure (up to 15 atmospheres) for one 200 hours depending on the particular foam property desired. For high density foams a short boiling time is desirable; for densities lower than 20 lbs/cu. ft longer times are required.

After the hydration step the polyimide is placed in an air circulating oven preheated to 270°–400° C. (temperatures on the order of 313° C. are preferred). The parts are heated at the selected temperature for 1 to 4 hours.

During this period the parts foam, producing a closed cell structure which possesses high compressive strength and low solvent, oil, and moisture absorption.

From the foregoing it will be apparent to the reader that one important and primary object of the invention resides in the provision of novel, improved polyimides which possess high tensile and compressive strengths over a wide temperature range, thermal stability, and low liquid absorption.

Another important and primary object of the invention resides in the provision of novel methods for making polyimides with the characteristics recited in the preceding object.

Other important objects of the present invention reside in the provision of polyimides having the characteristics recited in the first of the foregoing objects:

which can be produced in complex shapes and configurations;

which are obtained from dense, void free, molded polyimides and are therefore free of voids and similar irregularities;

which can be made from precursors having essentially indefinite shelf lives;

which are useful in a variety of applications of diverse character;

which have structures in which fillers and other additives can be readily and uniformly distributed.

Other important objects of the invention reside in the provision of processes for making porous, closed cell polyimides as described above:

which permit the density of the foamed material to be varied over a considerable range;

in which a porous, closed cell structure is developed by first hydrating a dense polyimide and then heating the hydrated material at high temperature;

in which, in conjunction with the preceding object, no chemical reactions occur in the molding step and no void producing gases are liberated;

which permit fillers and other additives to be incorporated in the final product without adversely affecting the porous, closed cell structure of the artifact.

Yet another important object of the invention resides in the provision of novel copolyimides which are thermomoldable and capable of being foamed to closed cell structures.

Other objects and advantages and additional novel features of the present invention will become apparent to those skilled in the relevant arts from the foregoing general description of the invention; from the appended claims; and from the following examples, which are intended to illustrate and not restrict the scope of the invention.

EXAMPLE I 3,3',4,4'-Benzophenonetetracarboxylic acid dianhydride (32.23 g, 0.10 M) was added to 150 mls of reagent ethanol. The mixture was heated and refluxed until the solids dissolved.

4,4'-Diaminodiphenylsulfone (12.41 g, 0.05 M) and 3,3'-diaminodiphenylsulfone (12.41 g, 0.05 M) were added to the acid mixture along with 100 mls of ethanol. The mixture was stirred and heated to about 40° C. until the solids dissolved.

The solution was filtered, and the solvent was removed under reduced pressure. The solid resinoid thus recovered was heated to effect polymerization in an inert (argon) atmosphere at 150° C., and the resulting copolymer was caused to flow and cured in a mold at 328° C. under 900 psi. The molded and polymerized material was transparent and quite flexible and had a specific gravity of 1.4 g/cm³.

Molded parts (5×0.5×0.5 in.) made by the procedure just described were placed in a 10 percent aqueous solution of sodium acetate and boiled up to 170 hours.

After hydration the parts were placed in an oven preheated at 315° C. and kept at this temperature for 1 to 2 hours. At the end of this step the parts had a porous, closed cell structure and low density and were hard and rigid.

The density of the parts varied with the time for which they were boiled as follows:

| Time of Boiling (Hours) | Density (g/cm³) |
| --- | --- |
| 0 | 1.4 |
| 20 | 1.0 |
| 48 | 0.8 |
| 72 | 0.7 |
| 170 | 0.5 |

At least 95 percent of the cells in the parts were closed. The parts had an alcohol absorption of less than two percent and a water absorption of less than one percent after immersion in these media for 24 hours.

The following examples describe the preparation of other exemplary molded polyimides which can be converted to foamed polyimide artifacts with a closed cell structure in accord with the principles of our invention.

EXAMPLE II 3,3',4,4'-Benzophenonetetracarboxylic acid (32.23 g, 0.10 M) was dissolved in reagent ethanol as in the previous example. 2,6-Diaminopyridine (5.45 g, 0.05 M) and 3,3'-diaminodiphenylsulfone (12.41 g, 0.05 M) were added to the mixture at room temperature along with 100 mls of ethanol and dissolved, also as described in Example I.

The solution was filtered and the solvent removed under reduced pressure at temperatures up to 71° C. The resulting material was powdered and dried overnight. Then it was polymerized in an argon atmosphere by heating it to 150° C.

The polymeric material was ground and heated to 308° C., producing a copolyimide which was caused to flow in a mold at 328° C. and 900 psi. The molded material was transparent and quite flexible and had a density of 1.4 g/cm³.

EXAMPLE III 3,3',4,4'-Benzophenonetetracarboxylic acid dianhydride (32.22 g, 0.10 M) was dissolved in 125 mls of ethanol to convert it to the diester. 2,6-Diaminopyridine (4.37 g, 0.04 M), 3,3'-diaminodiphenylsulfone (0.03 g, 0.04 M), and 4,4-diaminodiphenylsulfone (4.97 g, 0.02 M) and 124 mls of ethanol were added to the diester solution at room temperature. The mixture was stirred and heated until all solids were dissolved (30 minutes at approximately 30° C.). The solution was filtered by gravity, and the solvent was removed in a rotary evaporator and later in a vacuum oven at 78° C. The resulting foam was powdered and vacuum dried for one hour at 80° C., producing a monomeric resinoid powder.

The monomeric resinoid thus produced was found to have a long shelf life. It remained a free-flowing powder after storage for four months.

A portion of the resinoid was heated in a circulating air oven from room temperature to 150° C. in ten minutes. A foam formed. This foam was powdered and heated in air at 315° C. for ten hours.

The resulting powder was finely ground, placed in a steel die, and heated to 330° C. under 900 psi. After 30 minutes, the sample was cooled and removed from the die. A transparent reddish pellet was obtained.

EXAMPLE IV 3,3',4,4'-Benzophenonetetracarboxylic acid dianhydride (32.22 g, 0.10 M) was added to 23.24 (0.20 M) of normal heptanol, and the mixture was heated at 115°–120° C. for 15 to 60 minutes to convert it to the diester. Metaphenylenediamine (8.11 g, 0.075 M) and 2,6-diaminopyridine (2.72 g, 0.025 M) were added at 95°–100° C.; and the mixture was stirred and heated until homogeneous.

The viscous liquid this produced was transferred to an open dish where it solidified to a hard, solid resinoid. The resinoid was heated at 150° C. for two hours, pulverized, and heated for 10 hours at 315° C. The resulting powder was finely ground, placed in a steel die, and heated at 350° C. under 800 psi. After 30 minutes the sample was cooled and removed from the die. A dark brown pellet was obtained. It had a density of 1.4 g/cm³.

EXAMPLE V

Example IV was repeated except that 4.0 g of particulate molybdenum disulfide was added to the benzophenonetetracarboxylic ester before the diamines were mixed with it.

This procedure produced a composition in which the filler was homogeneously dispersed and wetted during the preparation of the resinoid. The molded and cured polyimide powder was molded according to the procedure described in Example IV. The hoop strength of the article was equal to that of a polyimide without the filler.

Other fillers can be employed with equal facility. Exemplary are those described in U.S. Pat. No. 3,793,281.

EXAMPLES VI-IX

Molded parts prepared as described in Examples II-V were hydrated and then heated to develop a porous, closed cell structure, both as described in Example I. The densities and other physical characteristics of the resulting foams were comparable to those obtained by following the procedure described in Example I.

The foregoing examples show that a variety of polyimides can be given a low density closed cell structure in accord with the principles of the present invention. They also show that materials such as fillers can be added to impart wanted properties to the final product without inhibiting the foamability of the polyimide. In addition they confirm that diamines having primary amine dissociation constants greater than $10^{-10}$ may be employed in association with diamines having lower dissociation constants.

In the tests described in Examples I and VI-IX, sodium acetate was employed to increase the rate of water absorption by the molded polyimide and thereby promote foaming in the subsequent heating step. Other electrolytes can of course be used instead. Examples are sodium and potassium formates, sodium and potassium propionates, and sodium chloride.

Alternatively, an ionic or nonionic surface active agent can be used to increase the rate of water absorption as shown by the following examples.

EXAMPLE X

Molded polyimide parts prepared as described in Example I were hydrated as also described in that Example except that two percent of an ionic surfactant (Dowflex 2 Al) was substituted for the sodium acetate. Hydration was followed by heating at 315° C. as in Example I.

The polyimide foamed as in the test described in Example I. The density and other physical characteristics of the parts were comparable to those obtained by following the procedure described in Example I.

EXAMPLE XI

The procedure described in Example X was repeated, substituting two percent of nonionic surfactant (Union Carbide L 530) for the ionic surfactant employed in the test described in the preceding Example.

The foamed artifacts that were obtained had essentially the same characteristics as those obtained by following the procedure of Example I.

EXAMPLE XII

To demonstrate the importance of the absorption of water in our novel process, the procedure of Example I was repeated using water without an electrolyte or surface active agent as the hydration medium and then heating the artifact at 315° C. to foam the polyimide.

Only incomplete foaming was obtained. A thin surface layer foamed, but the remainder of the artifact remained solid.

The foregoing examples demonstrate that foaming cannot be obtained without hydration and that the hydration medium must contain a surface active agent or an electrolyte for the best results. Above atmospheric pressures can also be used to promote hydration, thereby increasing the rate of hydration and decreasing the time needed to accomplish this step. Appropriate pressures are identified above.

As discussed previously, it is important that the resin to be foamed be a copolyimide made from a tetracarboxylic acid ester or esters and a mixture of diamines of specified character. To demonstrate this the tests described in the following examples were performed.

EXAMPLE XIII 3,3',4,4'-Benzophenonetetracarboxylic acid dianhydride (32.22 g, 0.10 M) was added to 150 ml of reagent alcohol. The mixture was heated and refluxed until the solids were dissolved. 4,4'-Diaminodiphenylsulfone (24.83 g, 0.10 M) was added to the mixture and stirred at 60° C. until dissolved. The solution was filtered and the solvent removed under reduced pressure at temperatures up to 71° C.

The resulting material was powdered, dried, and polymerized at 308° C., producing a polyimide which was caused to flow in a mold at 400° C. under 2000 psi. The part was dark and hard.

A 5×0.5×0.5 in. part obtained by the procedure just described was hydrated as described in Example I and then placed in an oven heated to 315° C. The part did not foam.

EXAMPLE XIV

The procedure described in Example XIII was repeated using 3,3',4,4'-benzophenonetetracarboxylic acid dianhydride (32.22 g, 0.10 M) and metaphenylenediamine (10.8 g, 0.10 M). The resulting polyimide was molded at 375° C. and 2000 psi. The part was dark and hard and could not be foamed by the procedure described in Example I.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A strong, thermally stable polyimide which has a low density and low absorption characteristics and is derived from an at least primarily open cell copolyimide which is the reaction product of at least one 3,3',4,4'-benzophenonetetracarboxylic acid diester and a mixture of primary diamines; said diamines being aromatic, para- or meta-substituted, and free of aliphatic moieties or heterocyclic; and said polyimide having a porous, closed cell structure which has not less than about 95 percent closed cells.

2. A strong, thermally stable polyimide which has a low density and low absorption characteristics, said polyimide having not less than about 95 percent closed cells and being produced by: preparing a precursor from at least one diester of 3,3',4,4'-benzophenonetetracarboxylic acid and a mixture of diamines; at least one of said diamines being aromatic para- or meta-substituted, and free of aliphatic moieties or heterocyclic; heating said precursor at a temperature in the range of 300° C. to 350° C. to convert said diester(s) and diamines to a polyimide; hydrating the polyimide thus obtained by heating it in an aqueous liquid at a temperature of 25°–250° C. and under a pressure of one to 15 atmospheres for a period of one to 200 hours; and heating the hydrated polyimide at a temperature of 270° C. to 400° C. for a time sufficiently long to develop a porous, closed cell structure.

3. A strong, thermally stable polyimide which has a low density and low absorption characteristics, said polyimide having not less than about 95 percent closed cells and being produced by: reacting 3,3′,4,4′-benzophenonetetracarboxylic acid or its anhydride with an esterifying agent to produce a 3,3′,4,4′-benzophenonetetracarboxylic acid diester; mixing with said diester a mixture of, primary diamines, said diamines being para- or meta-substituted aromatic and free of aliphatic moieties or heterocyclic; reducing the resulting mixture to a solid resinoid; foaming said resinoid by heating it to a temperature in the range of 125° to 150° C.; reducing the foamed material to particulate form; heating the particulate material under confinement at a temperature in the range of 300° to 350° C. and under a pressure of 300 to 2000 psi to cure the material and to impart a selected shape thereto; hydrating the polyimide thus obtained by heating it in an aqueous liquid at a temperature of 25°–250° C. and under a pressure of one to 15 atmospheres; and heating the hydrated polyimide at a temperature of 270° to 400° C. for 1 to 4 hours to develop a porous, closed cell structure.

4. A strong, thermally stable polyimide which has a low density and low absorption characteristics, said polyimide being produced by: preparing a precursor from a diester of 3,3′,4,4′-benzophenonetetracarboxylic acid and a mixture of diamines, of said diamines being para- or meta-substituted aromatic and free of aliphatic moieties or heterocyclic; heating said precursor at a temperature which is effective to convert said diester and diamines to a polyimide; hydrating the polyimide thus obtained by heating it in an aqueous liquid containing an effective amount of a water absorption promoting agent which is an electrolyte or a surface active agent at a temperature of 25°–250° C. and under a pressure of one to 15 atmospheres for a period of one to 200 hours; and heating the hydrated polyimide at an effective temperature for a time sufficiently long to develop a porous structure having not less than about 95 percent closed cells.

5. A polyimide as defined in any of the preceding claims 1–4, in which at least one of the diamines in the mixture has a base dissociation constant which is not greater than $10^{-10}$.

6. A polyimide as defined in any of the preceding claims 1–4, in which all of the diamines in the mixture thereof have a base dissociation constant which is not greater than $10^{-10}$.

7. A polyimide as defined in any of the preceding claims 1–4, in which the diamines are selected from the group consisting of 3,3′-diaminodiphenylsulfone, 4,4′-diaminodiphenylsulfone, 2,6-diaminopyridine, metaphenylenediamine, and paraphenylenediamine.

8. A polyimide as defined in any of the preceding claims 1–4, which contains two diamines.

9. A polyimide as defined in any of the preceding claims 1–4, which includes three or more diamines.

10. A polyimide as defined in any of the preceding claims 1–4, which has a density of not more than 1.4 grams per cubic centimeter.

11. A polyimide as defined in any of the preceding claims 1–4, which will absorb less than two percent of solvent and less than one percent water when immersed therein for a 24 hour period.

12. The combination of a polyimide as defined in any of the preceding claims 1–4, and a filler uniformly distributed throughout the polyimide.

13. A combination as defined in claim 12 wherein said filler is molybdenum disulfide.

14. A polyimide as defined in claim 4 wherein the water absorption promoting agent is an electrolyte.

15. A polyimide as defined in claim 14 wherein the electrolyte is selected from the group consisting of sodium acetate, sodium formate, sodium chloride, sodium propionate, potassium formate, and potassium propionate.

16. A polyimide as defined in claim 4 wherein the water absorption promoting agent is an ionic or nonionic surfactant.

* * * * *